(12) United States Patent
Di Silvestro et al.

(10) Patent No.: US 6,884,865 B1
(45) Date of Patent: *Apr. 26, 2005

(54) COPOLYAMIDES AND COMPOSITIONS BASED ON SAME

(75) Inventors: Giuseppe Di Silvestro, Seveso (IT); Franco Speroni, Laghetto (IT); Cuiming Yuan, Milan (IT); Haichun Zhang, Legnano (IT)

(73) Assignee: Rhodia Engineering Plastics S.R.L., Ceriano Laghetto (IT)

(*) Notice: Subject to any disclaimer, the term of this patent is extended or adjusted under 35 U.S.C. 154(b) by 0 days.

This patent is subject to a terminal disclaimer.

(21) Appl. No.: 10/344,266
(22) PCT Filed: Aug. 7, 2001
(86) PCT No.: PCT/EP01/09110

§ 371 (c)(1),
(2), (4) Date: Sep. 15, 2003

(87) PCT Pub. No.: WO02/12371
PCT Pub. Date: Feb. 14, 2002

(30) Foreign Application Priority Data

Aug. 9, 2000 (FR) .................................... 00 10485

(51) Int. Cl.$^7$ .................... C08G 73/10; C08G 69/48; C08L 77/00; B32B 27/34
(52) U.S. Cl. .................. 528/310; 528/170; 528/312; 528/322; 528/323; 528/328; 528/332; 528/335; 528/336; 528/339; 528/340; 528/347; 525/418; 525/419; 525/420; 525/422; 525/432; 524/600; 524/602; 524/606; 428/357; 428/364; 428/394; 428/395; 428/474.4; 264/176.1
(58) Field of Search ................... 528/170, 310, 528/312, 322, 323, 332, 328, 335–336, 339, 340, 347; 525/418–420, 422, 432; 524/600, 602, 606; 428/474.4, 364, 357, 394–395; 264/176.1

(56) References Cited

U.S. PATENT DOCUMENTS

| | | | | |
|---|---|---|---|---|
| 5,493,000 A | * | 2/1996 | Aharoni | 528/350 |
| 5,576,387 A | * | 11/1996 | Chambers | 525/92 B |
| 5,696,202 A | * | 12/1997 | Torre | 524/606 |
| 6,008,288 A | * | 12/1999 | Dalla Torre | 524/538 |
| 6,060,580 A | * | 5/2000 | Nijenhuis et al. | 528/332 |
| 6,160,080 A | * | 12/2000 | Cucinella et al. | 528/170 |
| 6,172,178 B1 | * | 1/2001 | Koning et al. | 528/310 |
| 6,277,911 B1 | * | 8/2001 | Torre | 524/606 |
| 6,525,166 B1 | * | 2/2003 | Di Silvestro et al. | 528/310 |

FOREIGN PATENT DOCUMENTS

| WO | WO 99/03909 A | 1/1999 |
|---|---|---|
| WO | WO 00/35992 A | 6/2000 |

* cited by examiner

Primary Examiner—P. Hampton Hightower
(74) Attorney, Agent, or Firm—Burns, Doane, Swecker & Mathis, L.L.P.

(57) ABSTRACT

The invention concerns copolyamides obtained by using multifunctional monomers. It consists in using at least one multifunctional monomer comprising at least three reactive functions and at least another multifunctional monomer, in amounts such that the terminal group concentrations are balanced. The copolyamides are more particularly high viscosity copolyamides. The invention also concerns compositions based on said copolyamides.

13 Claims, 1 Drawing Sheet

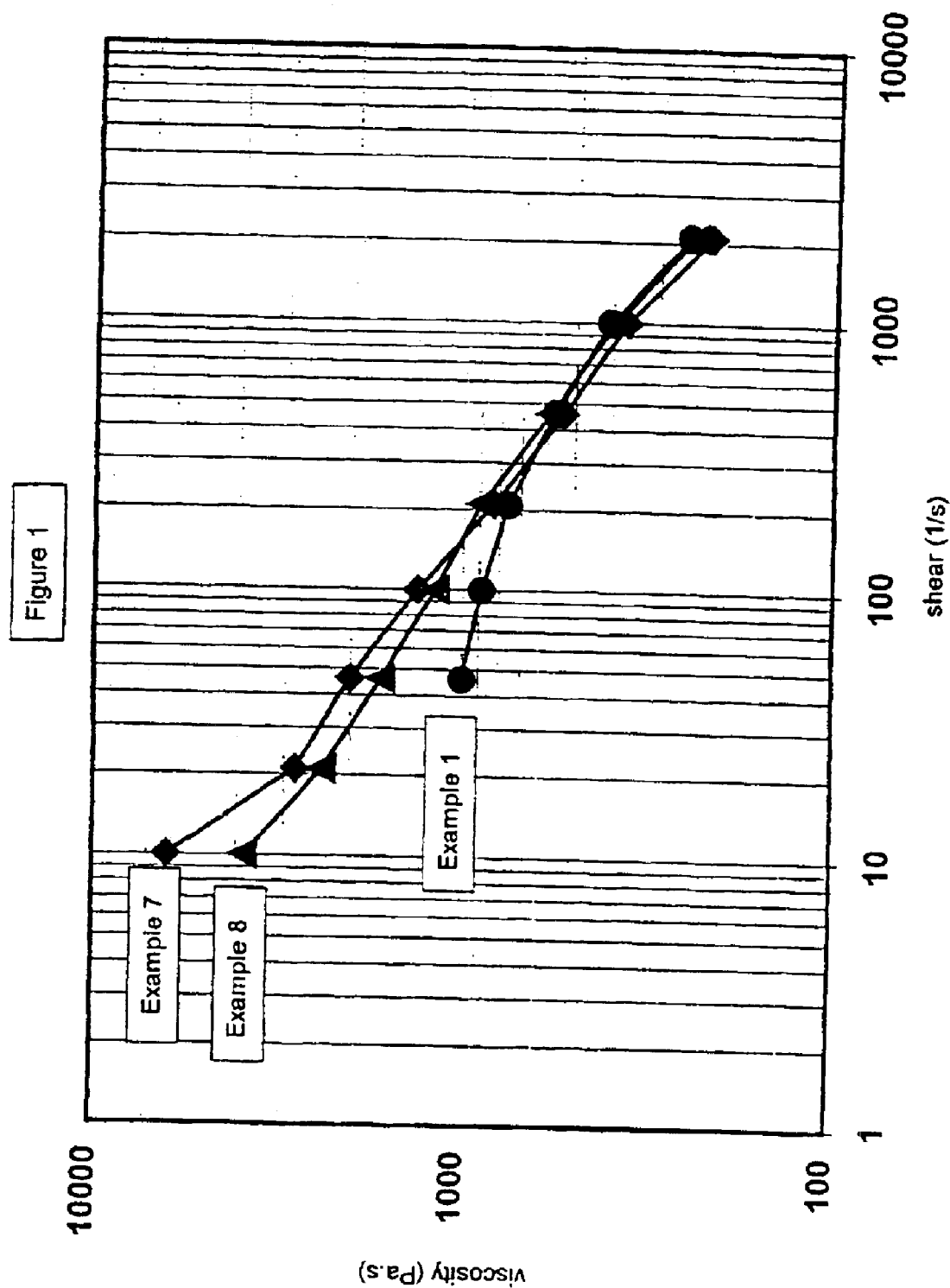

COPOLYAMIDES AND COMPOSITIONS BASED ON SAME

The present invention relates to copolyamides obtained using multifunctional monomers. The invention relates more particularly to high-viscosity polyamides. The invention also relates to compositions based on these copolyamides.

Formed thermoplastic polyamides are used for many applications. Examples that may be mentioned include yarns, fibers and filaments, films and articles obtained by molding, injection-molding or extrusion. For certain applications, or for certain forming processes, it is occasionally preferred to use polyamides with a high melt viscosity. This is the case, for example, for the polyamide fibers used for the manufacture of paper machine felts. This is also the case, for example, for processes for forming articles by extrusion blow-molding. During the implementation of the latter process, it is generally important for the extruded component not to deform, or to deform only very little under its own weight. The mechanical properties of the material, such as the elastic modulus and the impact strength, must moreover not be affected, or only very little affected.

Several solutions are known for obtaining high-viscosity polyamides. A first solution consists in performing a solid-phase postcondensation on linear polyamides. The postcondensation times are long, which gives rise to high production costs.

Another solution is described in patent application WO 99/03909. It describes copolyamides obtained using a multifunctional monomer comprising a reactive function that forms amide bonds, chosen from acids and amines, and at least two reactive functions that form amide bonds, which are of different nature and complementary to the previous function. These copolyamides have, for an identical melt-poly-condensation time, a higher melt viscosity than that of linear polyamides.

However, the copolyamides described in the document have a viscosity that it is sought further to improve. Another object is to achieve equivalent viscosities with shorter and/or controlled polymerization cycle times.

Within the technical field of copolyamides obtained from monomers including at least one multi-functional monomer the known documents include WO 00/35992. This document describes copolyamides obtained starting from a mixture of monomers including the following: a monomer AB, a monomer $A_v$ where $v \geq 3$, a monomer $B_w$ where $w \geq 2$, A and B being acid or amine functions, such that they are capable of forming amide units between them. The document teaches that it is not possible to obtain gel-free polymers unless the number of functions of the monomers and the amount of each monomer used are selected so as to satisfy a mathematical relation, defining a fairly restricted range of proportions. It is said that, outside of the range, gels are formed. Without going into the details of the formula, the document may be considered to teach that the monomers $A_v$ and $B_w$, and their proportions, must be selected so as to cause strong disequilibration of the amounts of functions of the two types provided by the monomers. This document does not describe the properties of the materials obtained, and so it is difficult to evaluate its import from a single reading.

The object of the present invention is to propose novel copolyamides, free of gel, and more particularly copolyamides obtained starting from multifunctional monomers which are present such that the amounts of functions of each type are substantially equilibrated. The novel copolyamides have a higher melt viscosity than that of the polyamides described in document WO 99/03909 or, for an equivalent viscosity, may be obtained with shorter polymerization cycles.

To this end, the invention proposes a copolyamide, comprising macromolecular units derived from at least the following monomers:

(I) at least one difunctional monomer represented by the abbreviation AB (II) at least one multifunctional monomer represented by the abbreviation $A_a$ in which A represents a function of the carboxylic acid type (III) at least one multifunctional monomer represented by the abbreviation $B_b$ in which B represents a function of the amine type the functions A and B being capable of reacting with each other to form an amide unit, a and b being numbers that satisfy the following relationships:

$a \geq 2$
$b \geq 2$
$a \geq 3$ if $b = 2$
$b \geq 3$ if $a = 2$ the ratio $$\frac{ax}{ax + by}$$

is between 0.4 and 0.6, in which x represents the number of moles of monomer (II) and y represents the number of moles of monomer (III)

the ratio $$\frac{ax + by}{(a + b) * (x + y + 0.9z)}$$

being less than 0.12% in which z represents the number of moles of monomer (I).

The term "multifunctional monomer" means a monomer comprising at least two reactive functions.

In the present patent application, the abbreviations (AB, $A_a$, $B_b$) are used to denote organic or organometallic molecules serving as monomers. The monomers are molecules with reactive functions of acid type A or of amine type B, capable together of forming amide bonds.

The acid-type functions are advantageously chosen from carboxylic acid, acid halide and ester functions. The amine-type functions are advantageously chosen from amines, preferably primary amines, and amine salts.

The number of functions of each type is represented for the various monomers by the letters a, b. The monomers (I) comprise a function of each type.

The monomers (II) and (III) comprise at least 2 functions, and preferably not more than 10. The number of functions for each (a and b, respectively) is preferably chosen from 3, 4, 5 and 6. Moreover, if one of the monomers (II) or (III) contains two functions, the other contains at least three of them.

The number of moles of monomer (II) from which the copolyamide is obtained is denoted by the letter x. The number of moles of monomer (III) from which the copolyamide is obtained is denoted by the letter y. The number of moles of monomer (I) from which the copolyamide is obtained is denoted by the letter z.

The ratio $\alpha$, $$\alpha = \frac{ax}{ax+by}$$

is between 0.4 and 0.6 and preferably between 0.45 and 0.55. Even more preferably, it is substantially equal to 0.5. This condition is equivalent to writing that the number of amine-type functions and the number of acid-type functions in the monomers (II) and (III) used to obtain the polymer is relatively, or even substantially totally, equilibrated.

According to one characteristic of the invention, the ratio $\beta$, $$\beta = \frac{ax+by}{(a+b)*(x+y+0.9*z)}$$

is less than 0.12% and preferably less than or equal to 0.1%. The use of monomers (II) and (III) in larger amounts may lead to crosslinked copolymers. As a guide, and with no limitation to the invention, the factor 0.9 applied to the number of moles z of the monomer of type AB takes into account that the monomers (I) generally do not react entirely. The above ratio is thus close to a ratio between the number of moles of monomers (II) and (III) and the number of moles of repeating units in the polyamide.

According to another characteristic of the invention, the ratio $\chi$, $$\chi = \frac{x+y}{x+y+0.9*z}$$

is preferably less than 0.2%.

The monomers (II) and the monomers (III) may consist, respectively, of a mixture of several monomers $A_{ai}$ and $B_{bj}$ in which $a_i$ and $b_j$ satisfy the conditions defined above for a, b, with the possible exception of the calculation of the ratios $\alpha$, $\beta$ and $\chi$, for which the following apply:

$$-ax = \sum_i a_i x_i$$

for the calculation of $\alpha$ and $\beta$ $$-by = \sum_j b_j y_j$$

for the calculation of $\alpha$ and $\beta$ $$-x = \sum_i x_i$$

for the calculation of $\beta$ and $\chi$ $$-y = \sum_j y_j$$

for the calculation of $\beta$ and $\chi$ in which
  $a_i$ represents the number of acid-type functions in a monomer (II) referenced i
  $b_j$ represents the number of acid-type functions in a monomer (III) referenced j $x_i$ represents the number of moles of a monomer (II) referenced i
  $y_j$ represents the number of moles of a monomer (III) referenced j.

The monomers (I) are advantageously chosen from:
  ε-caprolactam and/or the corresponding amino acid: aminocaproic acid, and/or
  para- or meta-aminobenzoic acid, and/or
  11-aminoundecanoic acid, and/or
  lauryllactam and/or the corresponding amino acid: 12-aminododecanoic acid.

More generally, the monomers (I) may be the monomers used to manufacture linear thermoplastic polyamides. Thus, mention may be made of ω-amino-alkanoic compounds comprising a hydrocarbon-based chain containing from 4 to 12 carbon atoms, or the lactams derived from these amino acids, for instance ε-caprolactam. Mixtures of monomers corresponding to the abbreviation AB, preferably chosen from the monomers proposed above, may also be used.

The monomers (II) and (III) are multifunctional monomers all of whose reactive functions are identical. The reactive functions of the monomer (II) are different from the reactive functions of the monomer (III), but both are capable of forming amide units between them. The multifunctional monomers all of whose functions are identical are often called "core monomers".

A first category of compounds which are suitable as monomers (II) and/or (III) consists of molecules or macromolecules with an arborescent or dendritic structure. Examples that may be mentioned include polyamines comprising a high number of amine units. Mention may also be made of the totally aromatic dendrimers described in patent applications WO 95/06081.

A second category of compounds which are suitable as monomers (II) and/or (III) consists of compounds that may be chosen from the compounds mentioned below.

Mention is made of multifunctional compounds chosen from the compounds of formula (a)

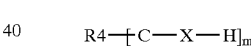
(a)

in which
  C is a covalent bond or an aliphatic hydrocarbon-based radical that may comprise hetero atoms, and containing from 1 to 20 carbon atoms and preferably from 1 to 6 carbon atoms,
  X is a radical

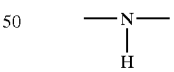

if it is a monomer (III),
or a radical

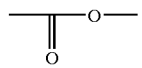

if it is a monomer (II)
  $R_4$ is a linear or cyclic, aromatic or aliphatic hydrocarbon-based radical containing at least two carbon atoms and possibly comprising hetero atoms,
  m is an integer between 3 and 8 (limits included).

According to one preferred embodiment of the invention the monomers (II) and (III) each contain at least three reactive functions. In this case the monomers (II) and (III) are advantageously selected from the monomers represented by the formula (a) shown above, X representing for the monomers (III) and (II) respectively a radical

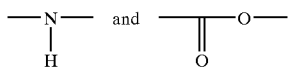

According to yet another preferred characteristic, the radical $R_4$ is either a cycloaliphatic radical such as the tetravalent cyclohexanoyl radical, or a 1,1,1-triylpropane or 1,2,3-triylpropane radical.

Examples of other radicals $R_4$ suitable for the invention that may be mentioned include substituted or unsubstituted trivalent phenyl and cyclohexanyl radicals, tetravalent diaminopolymethylene radicals with a number of methylene groups advantageously between 2 and 12, such as the radical derived from EDTA (ethylenediaminotetraacetic acid), octavalent cyclohexanoyl or cyclohexadinonyl radicals, and radicals derived from compounds obtained from the reaction of polyols such as glycol, pentaerythritol, sorbitol or mannitol with acrylonitrile.

Radical A is preferably a methylene or polymethylene radical such as an ethyl, propyl or butyl radical, or a polyoxyalkylene radical such as a polyoxyethylene radical.

According to one preferred embodiment of the invention, the number m is greater than or equal to 3 and advantageously equal to 3 or 4.

The reactive function of the multifunctional compound represented by the symbol X—H is a function capable of forming an amide function.

Examples of multifunctional compounds of formula (a) that may be mentioned include 2,2,6,6-tetrakis(β-carboxyethyl)cyclohexanone, diaminopropane-N,N,N'N'-tetraacetic acid of the following formula:

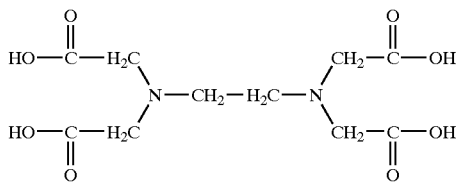

or compounds derived from the reaction of trimethylolpropane or glycerol with propylene oxide and amination of the hydroxide end groups; the latter compounds are sold under the trade name Jeffamines T® by the company Huntsman, and have the general formula:

in which:
$R_4$ represents a 1,1,1-triylpropane or 1,2,3-tri-ylpropane radical,
A represents a polyoxyethylene radical.

Examples of multifunctional compounds that may be suitable are especially mentioned in document U.S. Pat. No. 5,346,984, in document U.S. Pat. No. 5,959,069, in document WO 96/35739 and in document EP 672 703.

The following may be mentioned more particularly: nitrilotrialkylamines, in particular nitrilotriethyl-amine, dialkylenetriamines, in particular diethylene-triamine, trialkylenetetramines and tetraalkylene-pentamines, the alkylene preferably being ethylene, 4-aminoethyl-1,8-octanediamine.

Mention is also made of the dendrimers of formula (II)

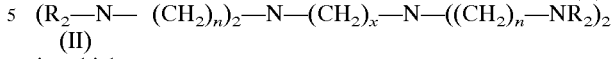

in which
R is a hydrogen atom or a group —$(CH_2)_n$—$NR^1_2$ in which
$R^1$ is a hydrogen atom or a group —$(CH_2)_n$—$NR^2_2$ in which
$R^2$ is a hydrogen atom or a group —$(CH_2)_n$—$NR^3_2$ in which
$R^3$ is a hydrogen atom or a group —$(CH_2)_n$—$NH_2$,
n being an integer between 2 and 6,
x being an integer between 2 and 14,
n is preferably an integer between 3 and 4, in particular 3, and x is preferably an integer between 2 and 6, preferably between 2 and 4 (limits included), in particular 2. Each radical R may be chosen independently of the others. The radical R is preferably a hydrogen atom or a group —$(CH_2)_n$—$NH2$.

Mention is also made of multifunctional compounds containing 3 to 10 carboxylic acid groups, preferably 3 or 4. Among these, the ones that are preferred are the compounds containing an aromatic and/or heterocyclic ring, for example benzyl, naphthyl, anthracenyl, biphenyl and triphenyl radicals, or heterocycles, for instance pyridine, bipyridine, pyrrole, indole, furan, thiophene, purine, quinoline, phenanthrene, porphyrin, phthalocyanine and naphthalocyanine. 3,5,3',5'-Biphenyltetracarboxylic acid, acids derived from phthalocyanine and from naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid and 1,3,6,8-acridinetetracarboxylic acid are most particularly preferred, and even more particularly trimesic acid and 1,2,4,5-benzenetetracarboxylic acid.

Mention is also made of multifunctional compounds whose core is a heterocycle containing a point of symmetry, for instance 1,3,5-triazines, 1,4-diazines, melamine, compounds derived from 2,3,5,6-tetraethylpiperazine, 1,4-piperazines and tetrathiafulvalenes. Mention is made more particularly of 1,3,5-triazine-2,4,6-triaminocaproic acid (TTAC).

According to one particularly advantageous embodiment, the copolyamide is obtained from systems of monomers (I), (II) and (III), of which the monomers (II) and (III) are chosen from the following systems:

system 1: monomer (II) $A_3$ and monomer (III) $B_3$
system 2: monomer (II) $A_4$ and monomer (III) $B_3$
system 3: monomer (II) $A_3$ and monomer. (III) $B_4$
system 4: monomer (II) $A_4$ and monomer (III) $B_4$
system 5: monomer (II) $A_3$ and monomer (III) $B_6$
system 6: monomer (II) $A_4$ and monomer (III) $B_6$ According to one preferred embodiment, no monofunctional monomer is used in addition to the monomers (I), (II) or (III).

In order to be able to perform the polymerization under the best possible conditions, monomers with a sufficient heat stability are most particularly preferred for the monomers (I), (II) and (III).

According to one advantageous characteristic, the melt flow index of the copolyamides, measured at 275° C. under 5 kg of pressure, is less than 10 g/10 minutes.

The invention also relates to compositions comprising the copolyamide described above. The compositions may comprise at least one polyamide in accordance with the invention and optionally other additives such as molding or mold-stripping agents, heat-stabilizers, light-stabilizers, antioxidants, flame retardants, pigments, colorants and lubricants. The composition may also comprise agents for improving the impact strength and/or bulking or reinforcing fillers. Mention is made in particular of glass fibers.

The compositions of the invention may also comprise as polymer matrix, in addition to the polyamide as described above, other thermoplastic materials such as linear aliphatic polyamides, optionally compatibilized, or aromatic or semi-aromatic polyamides, for example.

According to one characteristic of the invention, the compositions of the invention are obtained by blending, generally in a single-screw or twin-screw extruder, a polyamide in accordance with the invention with the various additives, this blending generally being performed with the polyamide melt, followed by extrusion of the blend in the form of rods that are then chopped into granules. Molded parts may then be made by melting the granules produced above and feeding the composition melt into suitable molding, injection-molding or extrusion devices.

A subject of the invention is also a process or manufacturing a copolyamide in accordance with the invention.

In a first embodiment of this manufacturing process, a mixture of monomers is prepared with determined proportions of each component. Said mixture is polymerized under conditions and according to a procedure equivalent to those used for the manufacture of the linear polyamide corresponding to the difunctional monomers used. Thus, when ε-caprolactam is used, water is added to the mixture of monomers to initiate the hydrolytic opening of the caprolactam.

According to a second embodiment of the invention, a linear polyamide prepolymer is manufactured by polycondensation of the monomers (I) to obtain a prepolymer with a number-average molecular weight $\overline{Mn}$ of the order of 2 000 to 3 000 approximately.

The monomers (II) and (III) are added to the linear prepolymer and the polymerization is continued either in molten medium or in solid phase. The solid-phase production method makes it possible especially to obtain copolyamides using multifunctional monomers that show heat stability at relatively low temperatures, for example below 200° C., since the solid-phase postcondensation temperature is reached at lower temperatures than those for polymerization in molten medium.

The addition of the monomers (II) and (III) may be performed in the extruder or in a reactor, the solid-phase postcondensation being carried out according to the standard conditions usually used for that of linear polyamides.

The invention also relates to a process for manufacturing novel copolyamides or novel compositions by extrusion, and to the copolyamides or compositions obtained by the process. This process uses multifunctional compounds, under conditions similar to those described above, and lead to macromolecular compounds or compositions whose characteristics are similar if not identical to those of the copolyamides and compositions described above.

A process is thus proposed for the manufacture of a copolyamide or a composition comprising a copolyamide, which consists in mixing in an extrusion device at least the following three compounds:

compound (I): a polyamide containing repeating units of formula (c) below:

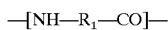
—[NH—R$_1$—CO]—     (c)

compound (II): monomer (II) as defined above compound (III): monomer (III) as defined above the ratios $$\frac{ax}{ax+by}$$

being between 0.4 and 0.6,
in which x represents the number of moles of compound (II) and y represents the number of moles of compound (III)
the ratio $$\frac{ax+by}{(a+b)*(x+y+z)}$$

being less than 0.3% and preferably 0.2%,
in which z represents the number of moles of repeating units in compound (I)
the radical R$_1$ being a hydrocarbon-based radical optionally comprising hetero atoms.
z is defined in the following manner:
z=m$_D$/M$_D$ in which m$_D$ is the mass of compound (I) used and M$_D$ is the molar mass of a repeating unit.
The ratio $$\frac{ax}{ax+by}$$

is preferably between 0.45 and 0.55. Even more preferably, it is substantially equal to 0.5.
The ratio $$\chi = \frac{x+y}{x+y+z}$$

is preferably less than 0.4%.

Compound (I) is preferably chosen from polyamide 6, polyamide 11, polyamide 12 and blends and copolymers based on these polyamides.

The process may comprise the introduction of fillers or additives as mentioned above. Glass fiber is most particularly mentioned.

The copolyamides or compositions according to the invention may be used in many applications, such as the manufacture of molded or injection-molded parts.

They are especially suitable for manufacturing parts by extrusion blow-molding techniques. Specifically, the low melt flow index of the copolyamide makes it possible to limit the deformations of the parisons during their extrusion, before the blow-molding step.

It is also possible to manufacture articles by injection-molding processes using the copolyamides of the invention. These articles have mechanical properties that are markedly higher than those of the articles obtained by injection-molding of a linear polyamide-based composition of the same melt flow index.

Other advantages or details of the invention will emerge more clearly in the light of the examples given below, purely for indicative purposes.

The following monomers are used:

CL: mixture of caprolactam and 6-aminocaproic acid (5% by weight)

J3: Jeffamine T 403, sold by the company Huntsman (triamine core monomer)

T4: 2,2,6,6-tetrakis(β-carboxyethyl)cyclohexanone (tetraacid core monomer).

The copolyamides are synthesized according to the cycle below:

Cycle:

Polymerization in an autoclave for 5 hours at atmospheric pressure, at 275° C., with circulation of nitrogen.

The characteristics and properties of the copolyamides evaluated are as follows:

melt flow index (MFI): evaluated according to standard ISO 1133 at 275° C. under 5 kg or 375 g of pressure.

relative viscosity (RV): evaluated in 96% sulfuric acid solution, according to standard ISO 307, $NH_2$ and COOH end groups: evaluated by potentiometric analysis in a 2.5% by weight solution of TFE (trifluoroethanol) at ambient temperature. Expressed as meq/kg of polymer, crosslinking: evaluated from the dissolution in TFE

EXAMPLES 1 to 8

Various copolyamides are synthesized, the characteristics of which are given in table I. The nature of the monomers (II) and (III) used, and the amount in molar percentage (respective ratios $$\frac{x}{x+y+0.9*z} \text{ and } \frac{y}{x+y+0.9*z}$$

are specified for each copolyamide. The monomer (I) used is the CL mixture.

| Example | Monomer (II) (nature, mol %) | Monomer (III) (nature, mol %) |
| --- | --- | --- |
| 1 | / | / |
| 2 | T4; 0.5 | / |
| 3 | / | J3; 0.5 |
| 4 | T4; 0.215 | J3; 0.285 |
| 5 | T4; 0.1075 | J3; 0.1475 |
| 6 | T4; 0.0645 | J3; 0.0855 |
| 7 | T4; 0.043 | J3; 0.057 |
| 8 | T4; 0.0215 | J3; 0.0285 |

The characteristics and properties are given table II.

TABLE II

| Example | MFI (g/10 min) | Weight for the measurement of MFI (g) | VR | $NH_2$ (meq/kg) | COOH (meq/kg) | Cross-linking |
| --- | --- | --- | --- | --- | --- | --- |
| 1 | 4 | 325 | 3.21 | 42.4 | 41.4 | No |
| 2 | 55 | 325 | 2.05 | 20 | 174 | No |
| 3 | 30 | 325 | 2.23 | 114 | 29.5 | No |
| 4 | <0.1 | 5000 | 3.05 | insoluble | insoluble | Yes |
| 5 | <0.1 | 5000 | 3.13 | insoluble | insoluble | Yes |
| 6 | 0.22 | 5000 | 3.63 | 32.8 | 25.8 | No |
| 7 | 0.8 | 5000 | 3.75 | 28.6 | 33.2 | No |
| 8 | 4.5 | 5000 | 3.86 | 33.2 | 24.2 | No |

EXAMPLE 9

The rheological properties of various polyamides and copolyamides are evaluated, at different shears. A GOETTFRERT WinRHEO V 3.22 capillary rheometer is used to do this; at a temperature of 250° C., and pressures of 65 to 1200 bar. These measurements are performed on the following polymers, respectively:

copolyamide according to example 7 copolyamide according to example 8 polyamide of example 1.

A BRIEF DESCRIPTION OF THE DRAWINGS

The curves representing the melt viscosity (Pa·s) as a function of the shear ($s^{-1}$) are given in FIG. 1.

It is observed that the difference in rheological behavior between a copolyamide according to the invention and a linear polyamide is more pronounced at low shear than at high shear. This makes these copolyamides according to the invention particularly advantageous, especially for extrusion processes. They show good processability in an extruder (high shear) and also a high viscosity at low shear, after extrusion, for a blow-molding operation.

What is claimed is:

1. A copolyamide, comprising macromolecular units at least the following monomers:

(I) at least one difunctional monomer represented by the abbreviation AB (II) at least one multifunctional monomer represented by the abbreviation $A_a$ in which A represents a carboxylic acid function (III) at least one multifunctional monomer represented by the $B_b$ in which B represents an amine function the functions A and B being capable of reacting with each other to form an amide unit a and b being numbers that satisfy the following relationships:

$a \geq 2$ $b \geq 2$ $a \geq 3$ if $b=2$ $b \geq 3$ if $a=2$ the ratio $$\frac{ax}{ax+by}$$

is between 0.4 and 0.6, in which x represents the number of moles of monomer (II) and y represents the number of moles of monomer (III)

the ratio $$\frac{ax+by}{(a+b)*(x+y+0.9z)}$$

is less than 0.12%, in which z represents the number of moles of monomer (I).

2. The copolyamide as claimed in claim 1, wherein $a \geq 3$ and $b \geq 3$.

3. The copolyamide as claimed in claim 1, wherein it comprises no unit derived from a monofunctional monomer.

4. The copolyamide as claimed in claim 1 wherein the ratio $$x\frac{x+y}{x+y+0.9*z}$$

is less than 0.2%.

5. The copolyamide as claimed in claim 1 wherein the monomers (II) and (III) are chosen from the monomers represented by formula (a)

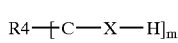 (a)

in which

C is a covalent bond or an aliphatic hydrocarbon radical that optionally comprises hetero atoms, and containing from 1 to 20 carbon atoms, X respectively represents for the monomers (III) and (II) a radical

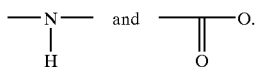

$R_4$ is a linear or cyclic, aromatic or aliphatic hydrocarbon radical containing at least two carbon atoms and optionally comprising hetero atoms, m is an integer between 3 and 8, limits included.

6. The copolyamide as claimed in claim 1 wherein the monomer (I) is chosen from caprolactam and aminocaproic acid, and mixtures thereof.

7. The copolyamide as claimed in claim 1 wherein the melt flow index, measured at 275° C. under 5 kg, is less than 10 g/10 minutes.

8. The copolyamide as claimed in claim 1 wherein it is obtained by mixing, in an extrusion device, at least the following three compounds:

compound (I): a polyamide containing repeating units of formula (c) below:

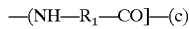

compound (II): monomer (II) as defined above
compound (III): monomer (III) as defined above
the ratio $$\frac{ax}{ax+by},$$

being between 0.4 and 0.6,
in which x represents the number of moles of compound (II) and y represents the number of moles of compound (III)
the ratio $$\frac{ax+by}{(a+b)*(x+y+z)}$$

being less than 0.3%
in which z represents the number of moles of repeating units in compound (I)
the radical $R_1$ being a hydrocarbon radical optionally comprising hetero atoms.

9. A composition comprising a copolyamide matrix and a reinforcing filler, wherein the matrix consists of a copolyamide as claimed in claim 1.

10. A yarn, fiber, filament, molded or injection-molded article, or film consisting of a copolyamide or of a composition as claimed in claim 1.

11. An article obtained by extrusion blow-molding of a polyamide or of a composition as claimed in claim 1.

12. The copolyamide as claimed in claim 5, wherein C is a aliphatic hydrocarbon radical optionally comprising hetero atoms, and containing from 1 to 6 carbon atoms.

13. The copolyamide as claimed in claim 8, wherein the ratio $$\frac{ax+by}{(a+b)*(x+y+z)}$$

is less than 0.2%.

* * * * *